(12) United States Patent
Xiong et al.

(10) Patent No.: US 10,528,058 B2
(45) Date of Patent: Jan. 7, 2020

(54) DISTANCE MEASURING METHOD OF ROBOT, ROBOT THEREOF, AND RECHARGING SYSTEM

(71) Applicant: UBTECH Robotics Corp, Shenzhen (CN)

(72) Inventors: Youjun Xiong, Shenzhen (CN); Jiawen Hu, Shenzhen (CN); Gaobo Huang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 196 days.

(21) Appl. No.: 15/719,594

(22) Filed: Sep. 29, 2017

(65) Prior Publication Data

US 2018/0348788 A1     Dec. 6, 2018

(30) Foreign Application Priority Data

Jun. 2, 2017  (CN) .......................... 2017 1 0409072

(51) Int. Cl.
*G05D 1/02* (2006.01)
(52) U.S. Cl.
CPC .......... *G05D 1/0272* (2013.01); *G05D 1/0225* (2013.01); *G05D 1/0242* (2013.01); *A47L 2201/022* (2013.01); *A47L 2201/06* (2013.01); *G05D 2201/0203* (2013.01)
(58) Field of Classification Search
CPC .............. A47L 2201/02; G05D 1/0225; G05D 1/0242; G05D 2201/0215; G05D 2201/0203; G05D 1/0272; G05D 1/0231
See application file for complete search history.

(56) References Cited

U.S. PATENT DOCUMENTS

| 2008/0009974 | A1* | 1/2008 | Kong ........................ G01S 5/30 700/258 |
| 2010/0030380 | A1* | 2/2010 | Shah ..................... G01S 7/4813 700/258 |
| 2011/0125504 | A1* | 5/2011 | Ko ......................... B25J 13/003 704/275 |

FOREIGN PATENT DOCUMENTS

| CN | 101726294 A | 6/2010 |
| CN | 101809461 A | 8/2010 |
| CN | 103317509 A | 9/2013 |

\* cited by examiner

*Primary Examiner* — Dale Moyer

(57) ABSTRACT

The present disclosure relates to a robot, a distance measuring method, and a recharging system for robot. The distance measuring method includes configuring a current position of a robot to be a first position, obtaining a first direction along a connection line from the first position to a signals transmitting position by a sensor of the robot, obtaining a second direction along a connection line from a second position to the signals transmitting position when the robot being driven by a driver to move along a moving direction by a predetermined distance to the second position, and the moving direction being perpendicular to the first direction to the second position, obtaining a distance between the second position and the signals transmitting position according to an included angle formed by the first direction and the second direction, and the predetermined distance.

8 Claims, 4 Drawing Sheets

does not exclude the presence of additional identical elements in the process, method, article or device that comprises the said element.

DISTANCE MEASURING METHOD OF ROBOT, ROBOT THEREOF, AND RECHARGING SYSTEM

CROSS REFERENCE TO RELATED APPLICATIONS

This application claims priority to Chinese Patent Application No. 201710409072.5, filed Jun. 2, 2017, which is hereby incorporated by reference herein in its entirety.

BACKGROUND

1. Technical Field

The present disclosure relates to intelligent appliances field, and more particularly to a distance measuring method, a robot thereof, and a recharging system for robot.

2. Description of Related Art

Robot is a new intelligent device configured to recharge automatically. Currently, most of the intelligent devices, such as sweeping robot, conduct the automatic recharging process by infrared alignment. Though the robots manufactured by different companies may have different automatic recharge processes, it is a key issue to obtain the distance between the robot and recharging dock.

However, when the robot stands, the distance between the robot and recharging dock obtained by the infrared may be inaccurate.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

Figure 1:
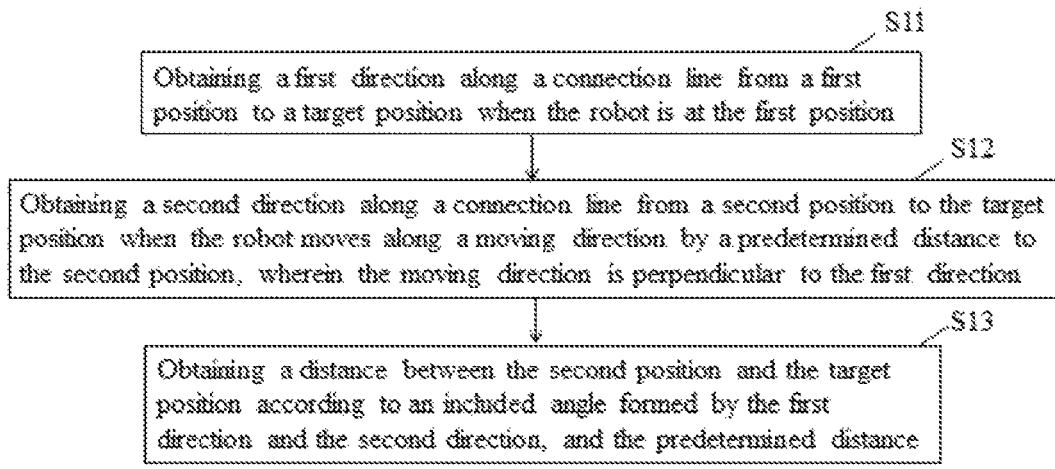
FIG. 1 is a flowchart illustrating a distance measuring method of a robot in accordance with one embodiment of the present disclosure.

Referring to FIG. 1, the present disclosure relates to a distance measuring method of a robot, including the following steps.

In step S11: obtaining a first direction along a connection line from a first position to a signals transmitting position when the robot is at the first position.

In step S12: obtaining a second direction along a connection line from a second position to the signals transmitting position when the robot moves along a moving direction by a predetermined distance to the second position, wherein the moving direction is perpendicular to the first direction.

Wherein the first position and the second position are configured to be a center of the robot. Considering a sweeping robot as an example, the first position and the second position are configured to be a center of a chassis of the sweeping robot.

It is noted that the moving direction of the robot is perpendicular to the first direction.

In step S13: obtaining a distance between the second position and the signals transmitting position according to an included angle formed by the first direction and the second direction, and the predetermined distance.

The distance between the second position and the signals transmitting position may be obtained by a triangle relation formed by the first direction, the second direction, and the moving distance of the robot.

Figure 2:
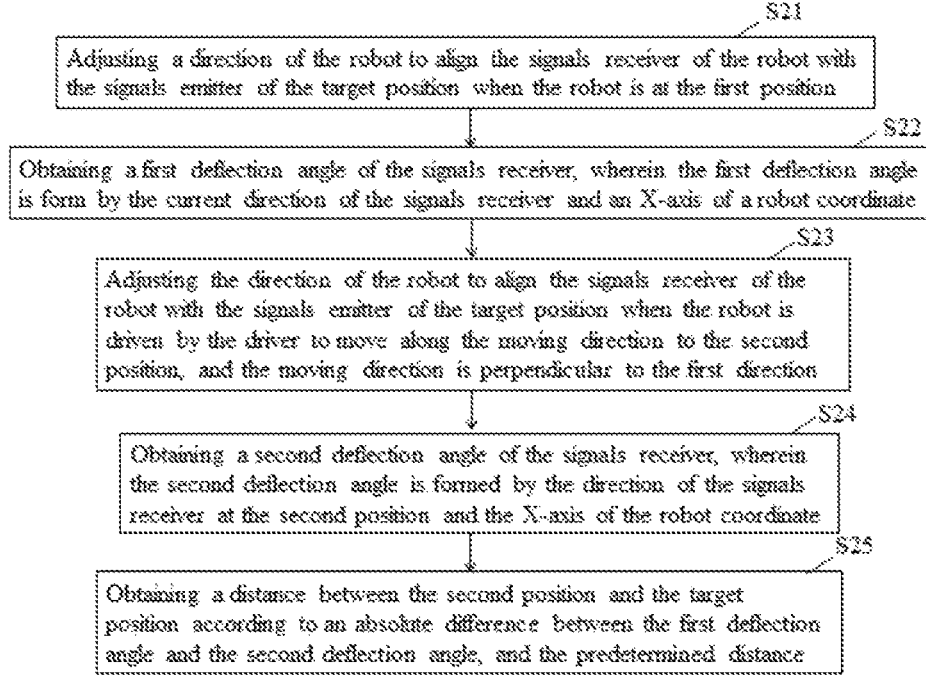
FIG. 2 is a flowchart illustrating a distance measuring method of a robot in accordance with another embodiment of the present disclosure.

FIG. 2 is a flowchart illustrating a distance measuring method of a robot in accordance with another embodiment of the present disclosure.

In one example, a signals emitter is configured on the signals transmitting position, and a signals receiver is configured on the robot. The signals receiver is configured to receive signals emitted from the signals emitter. The robot may determine whether the signals receiver align with the signals emitter and may adjust the direction to obtain the included angle formed by the first direction and the second direction.

Specifically, the distance measuring method may include the following steps.

In step S21: adjusting a direction of the robot to align the signals receiver of the robot with the signals emitter of the signals transmitting position when the robot is at the first position.

In one example, when the signals emitter is not aligned with the signals receiver, the signals emitted from the signals emitter may not be received by the signals receiver, and the robot may adjust the direction. When the signals emitted from the signals emitter may be received by the signals receiver of the robot, it is determined that the signals receiver is aligned with the signals receiver.

In another example, a threshold value may be configured. When intensity of the received signals is greater than the threshold value, it is determined that the signals receiver is aligned with the signals emitter.

In step S22: obtaining a first deflection angle of the signals receiver, wherein the first deflection angle is form by the current direction of the signals receiver and a predetermined direction.

In one example, the robot may detect the deflection angle between the direction of the robot and the predetermined direction during a rotation process. In another example, a speedometer and a gyroscope may be configured on the robot to obtain the position and the deflection angle of the robot.

In step S23: adjusting the direction of the robot to align the signals receiver of the robot with the signals emitter of the signals transmitting position when the robot is driven by the driver to move along the moving direction to the second position, and the moving direction is perpendicular to the first direction.

In step S24: obtaining a second deflection angle of the signals receiver, wherein the second deflection angle is formed by the direction of the signals receiver at the second position and the predetermined direction.

Figure 3:
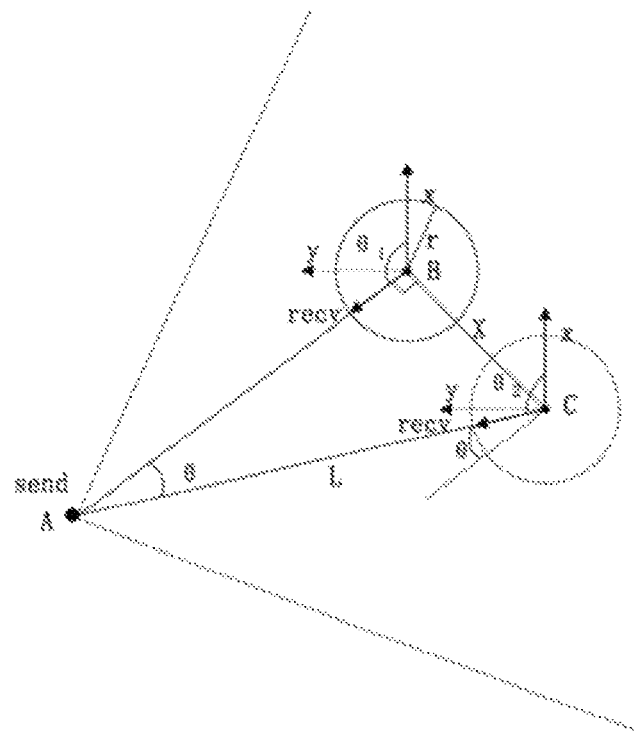
FIG. 3 is a diagram illustrating the relative position of the robot and the signals transmitting position in accordance with one embodiment of the present disclosure.

In the step S21 and S23, the direction of the robot may be adjusted by rotating the robot. In one example, as shown in FIG. 3, "A" indicates the signals transmitting position, "B" indicates the first position, "C" indicates the second position, "send" indicates the signals emitter, and "recv" indicates the signals emitter.

Wherein an area between two dashed lines originated from "A" indicates a range of the signals emitter. In one example, the range of the signals emitter may be a small range, and only when the signals receiver perfectly aligns with the signals emitter, the signals emitted from the signals emitter may be received. In another example, the threshold value may be configured. When intensity of the received signals is greater than the threshold value, it is determined that the signals receiver is perfectly aligned with the signals emitter.

Specifically, a center of the robot is configured to be an origin of an X-Y Cartesian coordinate system. Wherein an X-direction of the X-Y Cartesian coordinate system may be any direction. When the robot is at the position B, the direction of the robot may be adjusted the to align the signals receiver of the robot with the signals emitter of the position A, and to obtain the first deflection angle θ1 between the current position of the signals receiver and the predetermined direction (X-direction). The robot is further configured to adjust the direction to align the signals receiver with the signals emitter of the position A, when the robot moves from the position B along the moving direction (the direction is along the connection from the position B and the position C) by the predetermined distance to the position C, and the moving direction is perpendicular to the first direction. The robot is further configured to obtain the second deflection angle θ2 between the current position of the signals receiver and the predetermined direction (X-direction).

In step S25: obtaining a distance between the second position and the signals transmitting position according to an absolute difference between the first deflection angle and the second deflection angle, and the predetermined distance.

In one example, referring to FIG. 3, the distance between the second position and the signals transmitting position may be obtained by the following equation.

$$L = \frac{X}{\sin|\theta_1 - \theta_2|}$$

"L" indicates a distance between the robot and the signals transmitting position. "X" indicates the predetermined distance. "θ1" indicates the first deflection angle between the first direction and the predetermined direction. "θ2" indicates the second deflection angle between the second direction and the predetermined direction.

It is noted that "L" indicates the distance between the current position of the center C of the robot and the signals transmitting position A. In practice, when a rim of the robot contacts the position A, it is determined that the robot arrives to the position A. Thus, a distance is the distance between the rim of the robot and the signals transmitting position, and the distance may be obtained by minus "L" by a radius r of the robot, i.e., L−r.

In one example, the signals emitter may be an infrared signals emitter, the signals receiver may be an infrared signals receiver. In another example, the signals may be transmitted by laser, ultrasonic or other wireless signals transmission method.

In view of the above, the distance measuring method may include: obtaining the first direction along the connection line from the first position to the signals transmitting position when the robot is at the first position, obtaining the second direction along the connection line from the second position to the signals transmitting position when the robot moves along the moving direction by the predetermined distance to the second position, wherein the moving direction is perpendicular to the first direction, obtaining the distance between the second position and the signals transmitting position according to an included angle formed by the first direction and the second direction, and the predetermined distance. As such, the distance between the robot and the signals transmitting position may be accurately obtained, and the robot may accurately move to the signals transmitting position.

Figure 4:
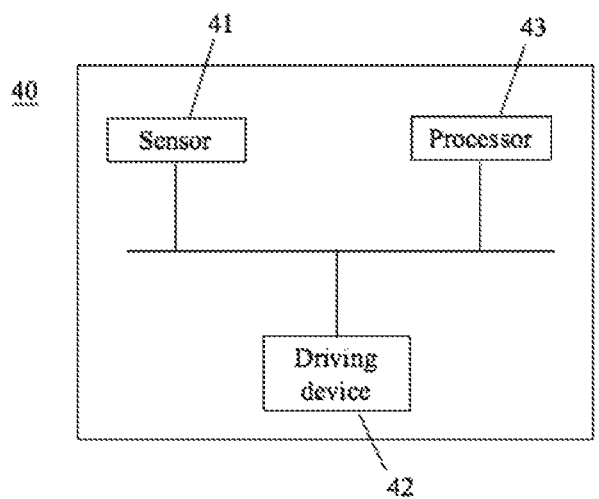
FIG. 4 is a schematic view of a robot in accordance with one embodiment of the present disclosure.

Referring to FIG. 4, the present disclosure further relates to a robot, including at least one sensor 41, a driving device 42, and a processor 43.

The sensor 41 is configured to obtain the first direction along the connection line between the first position and the signals transmitting position when the robot is at the first position, and to obtain the second direction along the connection line between the second position and the signals transmitting position when the robot is at the second position.

The driving device 42 is configured to control the robot to move from the first position along the moving direction by the predetermined distance to the second position, wherein the moving direction is perpendicular to the first direction.

The processor 43 is configured to obtain the distance between the robot and the signals transmitting position according to the included angle formed by the first direction and the second direction, and the predetermined distance.

Wherein the sensor 41 may be the speedometer and the gyroscope capable of obtaining the position and the direction of the robot. In one example, the sensor 41 may be the infrared receiver. The infrared emitter is configured on the signals transmitting position. The infrared receiver may receive the signals emitted from the infrared emitter, and may determine whether the infrared receiver aligns with the infrared emitter. The direction of the robot may be adjusted accordingly. So as to obtain the included angle formed by the first direction and the second direction.

The driving device 42 is configured to adjust the direction of the robot when the robot is at the first position. As such, the infrared receiver of the robot may align with the infrared emitter of the signals transmitting position. The driving device 42 is further configured to adjust the direction of the robot when the robot is at the second position, so as to align the infrared receiver of the robot with the infrared emitter of the signals transmitting position.

The processor 43 is configured to obtain the first deflection angle between the infrared receiver and the predetermined direction after the robot arrives at the first position and has adjusted the direction. The processor 43 is further configured to obtain the second deflection angle between the infrared receiver and the predetermined direction after the robot arrives at the second position and has adjusted the direction.

The processor 43 is further configured to obtain the distance between the second position and the signals transmitting position according to the absolute difference between the first deflection angle and the second deflection angle, and the predetermined distance.

In one example, the processor 43 may obtain the distance between the second position and the signals transmitting position by the following equation.

$$L = \frac{X}{\sin|\theta_1 - \theta_2|}$$

"L" indicates a distance between the robot and the signals transmitting position. "X" indicates the predetermined distance. "θ1" indicates the first deflection angle between the first direction and the predetermined direction. "θ2" indicates the second deflection angle between the second direction and the predetermined direction.

It is noted that "L" indicates the distance between the current position of the center C of the robot and the signals transmitting position A. In practice, when the rim of the robot contacts the position A, it is determined that the robot arrives at the position A. Thus, the distance between the rim of the robot and the signals transmitting position may be obtained by minus "L" by a radius r of the robot.

In one example, the processor 43 may be a core control chip connecting with the sensor 41 and the driving device 42, and is configured to control the sensor 41 and the driving device 42. Specifically, the driving device 42 may include a walk-driving portion, a rotation-driving portion, and a function-driving portion. Wherein the walk-driving portion is configured to control the robot to move along a straight line or a curve line. The rotation-driving portion is configured to control the robot to rotate. The function-driving portion is configured to control the robot to perform a corresponding function, such as a vacuum function of the sweeping robot.

Figure 5:
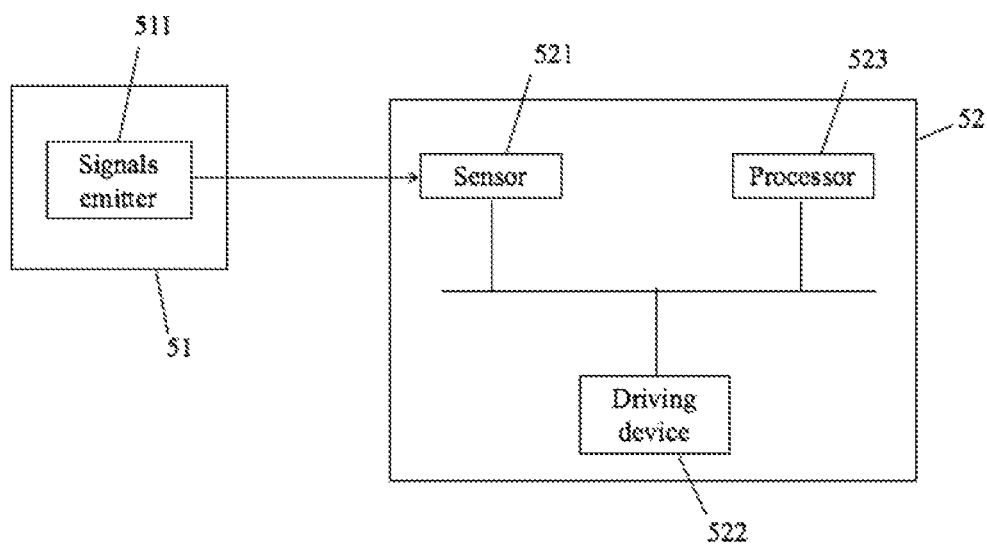
FIG. 5 is a schematic view of a recharging system for robot in accordance with one embodiment of the present disclosure.

Referring to FIG. 5, the present disclosure further relates to a recharging system for robot, including: a recharging dock 51 and a robot 52.

The recharging dock 51 is configured on the signals transmitting position and is configured with at least one signals emitter 511, and the recharging dock 51 is configured to recharge the robot 52.

The robot 52 may move to the signals transmitting position and may align with the recharging dock 51 to recharge the robot 52.

Specifically, the robot 52 may include the sensor 521, the driving device 522, and the processor 523.

The sensor 521 is configured to obtain the first direction along the connection line from the first position to the signals transmitting position when the robot is at the first position, to obtain the second direction along the connection line from the second position to the signals transmitting position when the robot moves the predetermined distance to the second position.

The driving device 522 is configured to the control the robot to move to the second position along the moving direction perpendicular to the first direction.

The processor 523 is configured to obtain the distance between the second position and the signals transmitting position according to the included angle formed by the first direction and the second direction, and the predetermined distance.

Wherein the sensor 521 may be the speedometer and the gyroscope capable of obtaining the position and the direction of the robot. In one example, the sensor 521 may be the infrared receiver. The infrared emitter is configured on the signals transmitting position. The infrared receiver may receive the signals emitted from the infrared emitter 511, and may determine whether the infrared receiver aligns with the infrared emitter. The direction of the robot may be adjusted accordingly. So as to obtain the included angle formed by the first direction and the second direction.

The driving device 522 is configured to adjust the direction of the robot when the robot is at the first position. As such, the infrared receiver of the robot may align with the infrared emitter of the signals transmitting position. The driving device 522 is further configured to adjust the direction of the robot when the robot is at the second position, so as to align the infrared receiver of the robot with the infrared emitter of the signals transmitting position.

The processor 523 is configured to obtain the first deflection angle between the infrared receiver and the predetermined direction after the robot arrives at the first position and adjusts the direction. The processor 43 is further configured to obtain the second deflection angle between the infrared receiver and the predetermined direction after the robot arrives at the second position and adjusts the direction.

The processor 523 is further configured to obtain the distance between the second position and the signals transmitting position according to the absolute difference between the first deflection angle and the second deflection angle, and the predetermined distance.

In one example, the processor 523 may obtain the distance between the second position and the signals transmitting position by the following equation.

$$L = \frac{X}{\sin|\theta_1 - \theta_2|}$$

"L" indicates the distance between the robot and the signals transmitting position. "X" indicates the predetermined distance. "θ1" indicates the first deflection angle between the first direction and the predetermined direction. "θ2" indicates the second deflection angle between the second direction and the predetermined direction.

Figure 6:
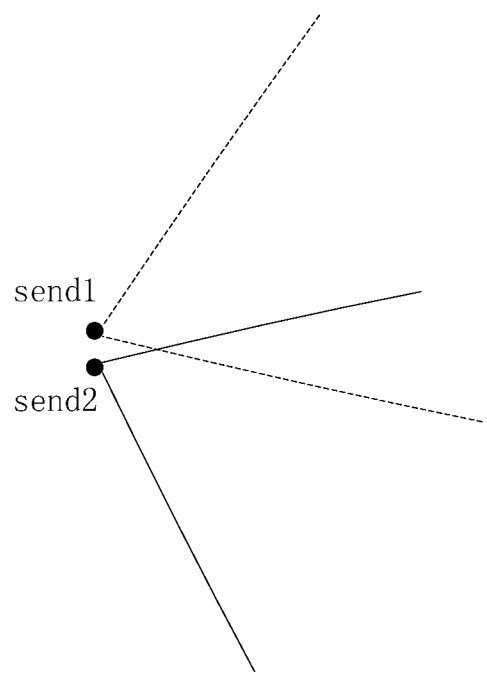
FIG. 6 is a schematic view of two infrared emitter of a recharging system for robot in accordance with one embodiment of the present disclosure.

In another example, the signals transmitting position may include two infrared emitters, wherein the two infrared emitters are arranged close to or next to each other. The two infrared emitters may enlarge the range of the infrared signals. As shown in FIG. 6, an area between two dashed lines is a range of a first infrared emitter send1. An area between two solid dashed lines is a range of a second infrared emitter send2. When the robot is within the range of the send1, the robot may receive the signals emitted from the send1 and may align with the send1. When the robot is within the range of the send2, the robot may receive the signals emitted from the send2 and may align with the send2. Due to the send1 and the send2 are closed to each other, the send1 and the send2 may be configured to be as the same infrared emitter. As such, the range of the infrared emitter may be enlarged.

It is noted that the robot of the recharging system may be the robot described in above, and may not be described again.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A distance measuring method of robots comprising at least one signals receiver, a driving device, and a processor, the method comprising:
    configuring, by the processor, a current position of a robot to be at a first position;
    adjusting, by the driving device, a direction of the robot to align a signals receiver of the robot with a signals emitter of the signals transmitting position;
    obtaining, by the processor, a first deflection angle of the signals receiver, wherein the first deflection angle is formed by the first direction and an X-axis of a robot coordinate;
    adjusting, by the driving device, the direction of the robot to align the signals receiver of the robot with the signals emitter of the signals transmitting position when the robot being driven by a driver to move along a moving direction by a predetermined distance to the second position, and the moving direction being perpendicular to the first direction;
    obtaining by the processor, a second deflection angle of the signals receiver, wherein the second deflection angle is formed by the second direction and the X-axis of the robot coordinate; and
    obtaining, by the processor, a distance between the second position and the signals transmitting position according to an absolute difference between the first deflection angle and the second deflection angle, and the predetermined distance.

2. The distance measuring method according to claim 1, wherein the step of obtaining, by the processor, the distance between the second position and the signals transmitting position according to an absolute difference between the first deflection angle and the second deflection angle, and the predetermined distance further comprising:
    obtaining, by the processor, the distance between the second position and the signals transmitting position by the following equation:

$$L = \frac{X}{\sin|\theta_1 - \theta_2|};$$

wherein L indicates a distance between the robot and the signals transmitting position, X indicates the predetermined distance, $\theta_1$ indicates the first deflection angle between the first direction and the X-axis of the robot coordinate, and $\theta_2$ indicates the second deflection angle between the second direction and the X-axis of the robot coordinate.

3. The distance measuring method according to claim 2, wherein the distance measuring method further comprises:
    obtaining, by the processor, a distance between a rim of the robot and the signals transmitting position by minus L by a radius of the robot.

4. The distance measuring method according to claim 1, wherein the signals receiver is an infrared receiver, and the signals emitter is an infrared emitter.

5. A robot, comprising:
    at least one sensor configured to obtain a first direction along a connection line from a first position to a signals transmitting position when a robot is at the first position, and to obtain a second direction along a connection line from a second position to the signals transmitting position when the robot moves along a moving direction by a predetermined distance, wherein the moving direction is perpendicular to the first direction;
    a driving device configured to drive the robot to move along the moving direction to the second position, wherein the moving direction is perpendicular to the first direction;
    a processor configured to obtain a distance between the second position and the signals transmitting position according to an included angle formed by the first direction and the second direction, and the predetermined distance.

6. The robot according to claim 5, wherein the sensor is a signals receiver;
    the driving device is further configured to:
    adjust a direction of the robot to align the signals receiver of the robot with the signals emitter of the signals transmitting position when the robot is at the first position;
    adjust the direction of the robot to align the signals receiver of the robot with the signals emitter of the signals transmitting position when the robot is at the second position;
    the processor is configured to:
    obtain a first deflection angle of the signals receiver after the driving device arrives the first position, wherein the first deflection angle is formed by the direction of the signals receiver at the first position and an X-axis of a robot coordinate;
    obtain a second deflection angle of the signals receiver when the robot is at the second position, wherein the second deflection angle is formed by the second direction and the X-axis of the robot coordinate;
    obtain a distance between the second position and the signals transmitting position according to an absolute difference between the first deflection angle and the second deflection angle, and the predetermined distance.

7. The robot according to claim 6, wherein the processor is configured to obtain the distance between the second position and the signals transmitting position by the following equation:

$$L = \frac{X}{\sin|\theta_1 - \theta_2|};$$

wherein L indicates a distance between the robot and the signals transmitting position, X indicates the predetermined distance, $\theta_1$ indicates the first deflection angle between the first direction and the X-axis of the robot coordinate, and $\theta_2$ indicates the second deflection angle between the second direction and the X-axis of the robot coordinate.

8. The robot according to claim 7, wherein the robot is configured to obtain a distance between a rim of the robot and the signals transmitting position by minus L by a radius of the robot.

* * * * *